United States Patent [19]

Witte et al.

[11] Patent Number: 4,514,848
[45] Date of Patent: Apr. 30, 1985

[54] METHOD AND APPARATUS FOR THE PRODUCTION OF PRE-PULSE-FREE, SMOOTH LASER RADIATION PULSES OF VARIABLE PULSE DURATION

[75] Inventors: Klaus J. Witte, Munich; Ernst Fill, Garching; Walter Scrlac, Maintal, all of Fed. Rep. of Germany

[73] Assignee: Max-Planck-Gesellschaft zur Foerderung der Wissenschaften e.V., Goettingen, Fed. Rep. of Germany

[21] Appl. No.: 359,078

[22] Filed: Mar. 17, 1982

[30] Foreign Application Priority Data

Mar. 25, 1981 [DE] Fed. Rep. of Germany ....... 3111805

[51] Int. Cl.$^3$ ............................................. H01S 3/091
[52] U.S. Cl. ...................................... 372/25; 372/55; 372/70
[58] Field of Search ....................... 372/70, 57, 30, 25, 372/55

[56] References Cited

U.S. PATENT DOCUMENTS

| | | | |
|---|---|---|---|
| 3,351,870 | 11/1967 | Goldsmith et al. | 372/38 |
| 3,605,038 | 9/1971 | Byrne et al. | 372/38 |
| 3,789,320 | 1/1974 | Hepburn | 372/59 |
| 3,879,686 | 4/1975 | Milam et al. | 372/25 |

OTHER PUBLICATIONS

Silfvast et al., "$C_3F_7I$ Photodissociation Laser Initiated by a $CO_2$-Laser-Produced Plasma", APL, vol. 25, No. 10, Nov. 15, 1974, pp. 593-595.
Hutchinson et al., "A Compact Electron Beam Pumped Excimer Laser System", Conference: Electro-Optics/-Laser International '80, U.K., Brighton, England Mar. 25-27 1980, pp. 291-296.
"Characteristics of an Argon-Laser-Pumped Ruby Laser" by A. Szabo, pp. 802-807, Journal of Applied Physics, vol. 46, No. 2 Feb. 1975.
"Excimer Lasers" by Ch. K. Rhodes, pp. 176-181, Springer-Verlag Berlin Heidelberg, New York 1979.

*Primary Examiner*—James W. Davie
*Attorney, Agent, or Firm*—Brumbaugh, Graves, Donohue & Raymond

[57] ABSTRACT

The pulse duration of an iodine laser is adjusted between 400 ps and 20 ns primarily by changing the resonator length in the range of about 2 cm to about 100 cm and secondarily by the ratio of excitation energy to threshold energy of the laser. Iodine laser pulses without pre-pulse and substructure are achieved in that the gas pressure of the laser gas of the iodine laser is adapted to the resonator length in order to limit the band width of the amplification and thus the band width of the pulse to be produced. The longer are the laser pulses to be produced the lower is the pressure chosen. A prerequisite for the above results is that the excitation of the iodine laser occurs extremely rapidly. This is advantageously achieved by photo-dissociation of a perfluoroalkyl iodide as $CF_3I$ by means of laser providing sufficiently short output pumping pulses, e.g. an excimer laser, as a KrF laser or XeCl laser or a frequency-multiplied Nd-glass or Nd-YAG laser, or a $N_2$ laser (in combination with t-$C_4F_9I$ as laser medium). In addition to the substantial advantage of the easy variability of the pulse duration the method additionally has a number of further advantages, namely pre-pulse-free rise of the laser pulse up to the maximum amplitude; exchange of the laser medium between two pulses is not necessary at pulse repetition rates below about 1 hertz; high pulse repetition rates obtainable with laser gas regeneration; switching elements for isolating a laser oscillator from a subsequent amplifier cascade for the purpose of avoiding parasitic oscillations are not as critical as with flashlamp-pumped lasers.

2 Claims, 4 Drawing Figures

METHOD AND APPARATUS FOR THE PRODUCTION OF PRE-PULSE-FREE, SMOOTH LASER RADIATION PULSES OF VARIABLE PULSE DURATION

The present invention relates to lasers, more specifically to method and apparatus for producing pre-pulse-free, smooth laser radiation pulses having substantially no temporal substructure, whose duration is adjustable between about 400 picoseconds and about 20 nanoseconds.

THE PRIOR ART

Pre-pulse-free smooth laser pulses having essentially no sub-structure and a duration freely selectible within a certain range are required for many purposes. For example, an iodine pulse ($\lambda = 1.315$ μm) with a smooth envelope and without pre-pulse is required as the input pulses for an iodine laser amplifier cascade, in which the pulse duration should be continuously adjustable between 0.4 ns and 20 ns in order to be able to carry out experiments with the pulse amplified by the iodine laser amplifier cascade which should lead to the production of energy by nuclear fusion. Another use of such pulses is the measurement of short relaxation times in liquids or the distance measurement.

It is known in the art, that laser radiation pulses can be produced with a duration in the range of 1 ns and below by the technology of mode-locking. This technology fails, however at pulse durations above about 2 ns.

It is further known, that laser radiation pulses in the range of 1–20 ns can be produced by cutting out of a longer pulse. Generally electro-optical methods are used for this purpose. This method is however relatively expensive and leads in additions to small pulse energies and poor efficiencies since only a small portion of a longer pulse is utilized.

THE INVENTION

It is accordingly an object of the present invention to provide a method with which a laser radiation pulse with a smooth envelope, i.e. without substantial temporal substructure, and without pre-pulse can be produced without using frequency selective or active electro-optical elements in the optical resonator of the laser, in which the pulse duration should be continuously variable between about 0.4 ns and 20 ns.

This object is achieved in short by an excitation (pumping) of the laser medium, the duration of which is shorter than the build-up time of the stimulated laser radiation pulse emitted by the excited laser medium.

The laser medium should satisfy the following conditions:
(a) the (full) half width $\Delta\gamma$ of the laser transition between the upper and lower energy laser levels is adjusted by pressure and/or temperature so that the condition $\Delta\nu = c/2L$ is fulfilled, in which c means the velocity of light and L the length of the optical resonator;
(b) the life-time of the upper laser level (quench time) is greater than the duration of about 30 round trips of the radiation in the optical resonator, and
(c) the life-time of the upper level as a consequence of spontaneous emission is greater than 100 nanoseconds (corresponding to an Einstein coefficient smaller than $10^7 s^{-1}$).

In the method in accordance with the invention the length of duration of the pulse is primarily determined by the resonator length of the laser. To a lesser extent the pulse duration can also be influenced by changing the relationship of the excitation energy ("pumping energy") to the threshold energy of the laser ("hard" or "soft" pumping). Thus if one selects the excitation duration, i.e. the duration of the pumping radiation, shorter than the build-up time of the emitted laser radiation pulse which corresponds approximately to 30 to 40 resonator round trips, the duration of the emitted pulse is thus primarily determined by the resonator length, it is in particular approximately equal to three to five times the length of the round trip time of the radiation in the resonator. In this manner the pulse duration can be varied between about 400 ps and 20 ns in dependence on the resonator length.

Conditions (a) to (c) set on the laser are fulfilled e.g. by an iodine laser, whose laser medium may contain an alkyl iodide, e.g. $CF_3I$, $C_2F_5I$, $i-C_3F_7I$, $n-C_3F_7I$ or $t-C_4F_9I$. Excimer lasers, e.g. a KrF laser or an XeCl laser, whose radiation duration is smaller than 100 ns, are particularly suitable as the excitation radiation source. Further useful excitation radiation sources are Nd-glass and Nd-YAG lasers (with frequency multiplication of the output radiation) and the $N_2$ lasers having sufficiently short output pulse duration.

In addition to the substantial advantage of the easy variability of the pulse duration the method in accordance with the invention has in addition a number of further advantages:
- pre-pulse-free rising of the laser pulse up to the maximum amplitude;
- exchange of the laser gas between two pulses ("shots") is not necessary at repetition rates up to about 1 per second;
- high pulse repetition rates up to kilohertz range obtainable (with exchange of the laser gas in the optical resonator);
- switching elements for isolation between a laser oscillator and a laser amplifier cascade for the purpose of avoiding parasitic oscillations are not as critical than with conventional flash-lamp pumped lasers.

Exemplary embodiments of the invention are described in more detail below with reference to the drawing.

SHORT DESCRIPTION OF THE DRAWINGS

Figure 1:
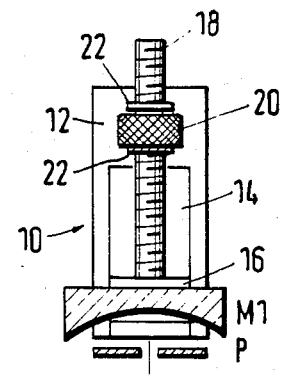
FIG. 1 is a simplified view of a preferred embodiment of an apparatus for carrying out the method in accordance with the invention that operates with transverse irradiation of the exciting radiation.
Figure 1:
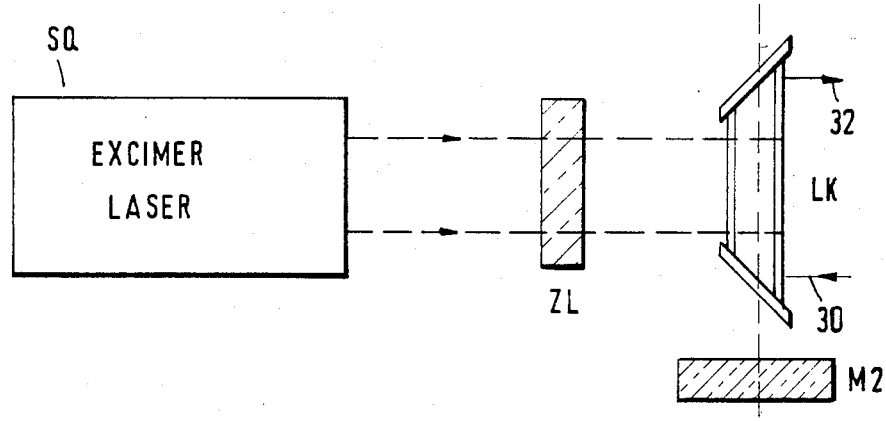

The preferred apparatus illustrated in FIG. 1 includes a laser cuvette LK which is closed at the end by Brewster windows. The laser cuvette LK serves to accomodate a laser gas which contains or consists of an iodine compound from which excited iodine atoms can be produced by photo-dissociation which are capable of a stimulated emission (laser emission). The laser gas advantageously comprises essentially a perfluoroalkyl iodide, preferable $CF_3I$; other useful compounds are $C_2F_5I$, $n-C_3F_7I$, $i-C_3F_7I$ and $t-C_4F_9I$. The laser cuvette LK is arranged in an optical resonator which is defined by two mirrors M1 and M2, whereby the one mirror M1 has as high a possible reflection at the emission wavelength (1.315 μm) of the iodine laser and can be a concave mirror, whilst the other mirror M2 has a certain transmission so that the radiation from the resonator can be coupled out, as known in the art.

The spacing of the mirror M1 and M2 is adjustable by means of an adjustment device 10. The range of adjustment is relatively large in contrast to that of the conventional laser mirror adjusting devices, generally larger than 25 cm, it can be up to 100 cm, and be arranged in particular for an adjustment of the resonator length of about 4 cm to 100 cm.

The adjustment device 10 illustrated schematically in FIG. 1 includes a base plate 12 with a screw 14 in which a sliding member 16 carrying the mirror M1 is slidably mounted. On the sliding member 16 a micrometer spindle 18 is mounted on which a knurled nut 20 sits which is axially fixed between two rings 22 mounted on the base plate 12. The adjustment of the mirror M1 is effected by virtue of rotation of the knurled nut 20.

A light stop or diaphragm P is arranged in the resonator, preferably in front of the mirror M1, to limit the laser emission to the lowest transverse oscillation mode ($TEM_{oo}$).

The photo-dissociation of the iodine compound in the laser cuvette is achieved by an optical radiation from an excitation radiation source SQ. An important condition of the method in accordance with the invention resides in the fact that the excitation of the laser, that is to say the photo-dissociation of the iodine compound, occurs extremely rapidly. This can be achieved by the use of e.g. an excimer laser, as a KrF laser of an XeCl laser, as the radiation excitation source. Other useful sources for the exciting or pumping radiation are a Nd-glass or a Nd-YAG laser, both in combination with an output radiation frequency multiplier, or if the laser medium comprises $t-C_4F_9I$, a $N_2$ laser. The (full) half maximum width $\Delta\gamma$ of the laser radiation line must at least approximately satisfy the following condition:

$$\Delta\nu = c/2L$$

in which
c means the velocity of light and
L the length of the optical resonator of the laser.

Figure 1A:
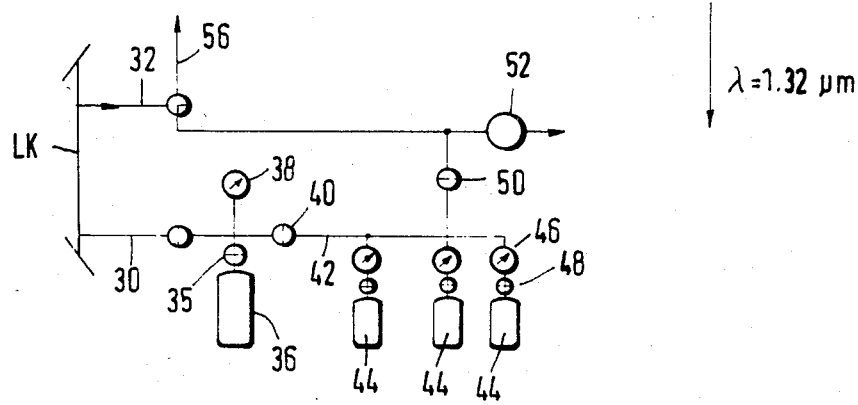
FIG. 1a is a schematic representation of a gas feed system for the apparatus in accordance with FIG. 1.

The setting of the half width to the value required by this condition can be easily achieved by means of the pressure of the laser gas. The temperature also has a certain influence on the line width. The adjustment of the pressure of the laser gas can be effected in a known manner, the devices and connections of the laser cuvette necessary for this are shown for the sake of simplicity only in FIG. 1a and there only schematically: The laser cuvette LK is provided with an inlet line 30 and an outlet line 32. The inlet line is connected via a valve 34 to a gas supply container 36 which can be shut off by a valve 35 and to a pressure measuring device 38 and via a further valve 40 to a line 42 to which pressurised gas bottles 44 for the required gases are each connected via a flow measuring device 46 and a valve 48. The line 42 is additionally connected via a valve 50 to the inlet of a vacuum pump 52. The outlet line 32 can be connected to a gas outlet 46 or the inlet of the pump 52 via a threeway valve 54. Alternatively, a known laser gas recirculating and regenerating system can be used.

In the apparatus shown in FIG. 1 the exciting radiation (pumping radiation) is irradiated by the excitation radiation source SQ transverse to the optical axis of the actual iodine laser. The radiation emitted by the radiation excitation source SQ is focused for this with a cylinder lense ZL in the laser cuvette LK which contains the iodide. The transverse geometry shown in FIG. 1 is distinguished by great simplicity and is preferred when one is primarily interested in a simple construction.

Figure 2:
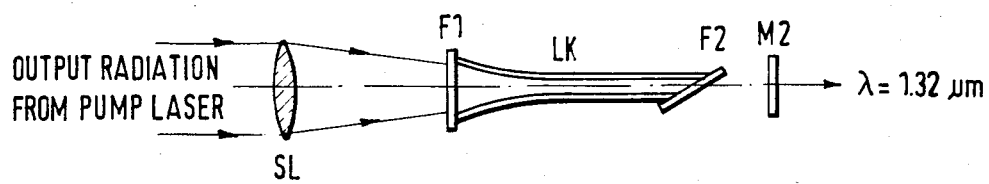
FIG. 2 is a representation of a part of a second preferred apparatus for carrying out the method in accordance with the invention that operates with longitudinal irradiation of the exciting radiation.
Figure 3:
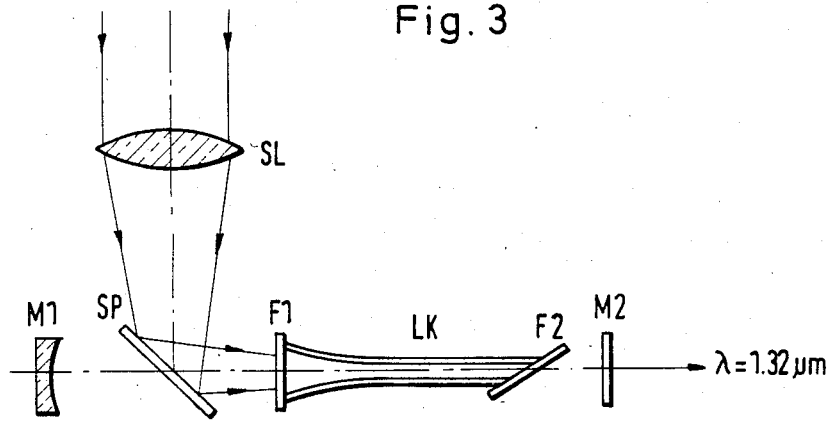
FIG. 3 shows a modification of the apparatus in accordance with FIG. 2

Exemplary embodiments of apparatus for carrying out the method in accordance with the invention are shown in FIGS. 2 and 3 in which the exciting radiation (pumping radiation) is irradiated longitudinally into the laser resonator. The excitation radiation source is not shown, as in the apparatus in accordance with FIG. 1 it preferably comprises here also a laser of the type mentioned above.

The longitudinal arrangements in accordance with FIG. 2 and 3 both have the advantage that the excited laser gas volume can be adapted to the volume of the lowest transverse oscillation type, whereby the necessity of a light stop is removed. Furthermore, with a cuvette length above 10 cm virtually all the exciting radiation is absorbed in the laser medium which results in a good utilisation of the exciting radiation. These arrangements, particularly that in accordance with FIG. 3, are therefore preferred when a high effectivity of the exciting radiation is of particular importance.

In the apparatus in accordance with FIG. 2 the exciting radiation from the pumping radiation source is focused by a spherical lens SL and coupled into the iodine laser cuvette LK by means of a quartz disc F1 having no reflective coating. The quartz disc F1 acts at the same time as the one end mirror for the optical resonator of the iodine laser. On the other side the cuvette is provided wth a Brewster window F2. The optical resonator of the iodine laser is defined by the quartz disc F1 and a tuning mirror M2 whose transmission is freely selectible. The iodine laser cuvette LK can be constructed as a light guide in order to ensure a homogeneous distribution of the exciting radiation. This device also is relatively simple, however it has the disadvantage that only a fraction of the iodine laser radiation can be coupled out as useful output radiation.

In the apparatus shown in FIG. 3 the excitation radiation is focused by a collecting lens SL and then reflected longitudinally into the laser cuvette LK of the iodine laser by means of a beam splitter or divider plate SP. The beam splitter plate SP should have as high a possible a reflection for the exciting radiation at 45° angle of incidence and as high a possible a transmission for the iodine laser radiation of 1.315 μm. A beam splitter plate with a hole of about 2 mm diameter can however also be used, then only a reflection for the exciting radiation must be large. The iodine laser resonator is defined by a concave end mirror M1 which should reflect the laser radiation as completely as possible and a tuning mirror M2 which is partially transmissive.

The iodine lasers described pumped by a laser providing extremely short output pulses have a number of substantial advantages over conventional iodine lasers excited with flash lights regardless of the direction of irradiation of the exciting radiation:

The pulse duration can be adjusted as desired within the range of 400 ps to 20 ns by changing the resonator length. Further, the pressure in the laser cuvette must be adapted to the resonator length in order to achieve a pulse without sub-structure, i.e. the longer are the pulses to be produced the lower must be the pressure in order to limit the band width of the amplification and thus the band width of the pulse to be produced. The dependence of the amplification band width on the pressure of the laser gas is known in principle from German patent specification No. 24 09 940.

In a preferred embodiment of the present method essentially undiluted $C_3F_7I$ is used as laser gas. The pressure is about $4\cdot10^4$ Pa at a resonator length of 2 cm and is decreased to about $3\cdot10^3$ Pa when the resonator length is increased up to 1 m.

The laser gas may comprise a diluting gas, as argon. The intensity of the pulse increases monotonically up to the maximum amplitude and is free of secondary maxima (pre-pulses) before the primary maximum. Thus a pre-pulse-free individual pulse is ensured in a simpler manner and without critical additional active or passive elements.

An exchange of the laser medium (iodide) between two pulses is generally not necessary since by virtue of the rapid build-up time of the laser pulse up to initiation of the laser emission no quenching of the excited state by impurities or photolytically produced $I_2$ occurs.

After a large number of pulses replacing the laser medium is of course necessary since it is used up as a consequence of irreversable processes. Thus, when high pulse repetition rates are described, means for replacing or for recirculating, purifying and regenerating of the laser gas in the optical resonator should be provided.

The pulse repetition rate of the laser is substantially determined by the pulse repetition rate of the excitation radiation source (e.g. the excimer laser), which with the present state of the technology results in a substantially higher pulse repetition rate (up to the kilohertz range) than when using Xenon flash lamps as the excitation radiation source.

Energy and power of the iodine laser pulse produced by pumping laser radiation are substantially higher than the corresponding values with pulses produced by Xenon flash lamp pumping.

The invention is not limited to iodine lasers but can find application e.g. in a corresponding manner with a $CO_2$ laser also. Here also the adjustment of the line width by pressure and/or temperature of the laser gas is possible. The invention can also be realised with a ruby laser amongst others. The adjustment of the line width can occur here by means of the temperature. Generally, the ruby rod should be operated at a temperature below 70 K.

We claim:

1. A method of producing pre-pulse-free, smooth laser radiation pulses having substantially no temporal sub-structure, whose duration is adjustable between about 400 picoseconds and about 20 nanoseconds, by means of a laser which includes an optical resonator, a stimulatable laser medium arranged in the resonator having an upper and lower level forming a laser transition, and an excitation source for populating the upper level of the laser medium comprising:

(a) adjusting the temperature and pressure conditions of the laser medium so that the condition $\Delta\nu = c/2L$ is fulfilled, in which $\Delta\nu$ represents half the maximum width of the laser transition, c means the velocity of light and L the length of the optical resonator; and (b) stimulating the laser medium so that the duration of excitation is shorter than the build up time of the stimulated laser radiation pulse emitted by the exciteed laser medium, the life-time of the upper laser level is greater than the duration of about 30 round trips of the radiation in the optical resonator, and so that the life-time of the upper level as a consequence of spontaneous emission is greater than 100 nanoseconds.

2. A method as claimed in claim 1 including stimulating the laser medium so that the duration of the excitation is smaller than the duration of 30 round trips of the stimulated emitted radiation in the optical resonator.

* * * * *